(12) United States Patent
Shingai et al.

(10) Patent No.: US 6,731,590 B1
(45) Date of Patent: May 4, 2004

(54) OPTICAL RECORDING MEDIUM CONTAINING A SUBSTRATE, AN INTERMEDIATE LAYER HAVING THEREIN AN AMORPHOUS MATERIAL, THE INTERMEDIATE LAYER HAVING A REFLECTIVE LAYER THEREON

(75) Inventors: Hiroshi Shingai, Tokyo (JP); Hideki Hirata, Tokyo (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 09/714,174

(22) Filed: Nov. 17, 2000

(30) Foreign Application Priority Data

Nov. 19, 1999 (JP) .............................. 11-329869
Oct. 2, 2000 (JP) ........................ 2000-302796

(51) Int. Cl.[7] .............................. G11B 7/24; G11B 5/66
(52) U.S. Cl. ................................ 369/286; 428/694 ML
(58) Field of Search ..................... 369/275.1

(56) References Cited

U.S. PATENT DOCUMENTS

| | | | | |
|---|---|---|---|---|
| 4,600,682 A | * | 7/1986 | Spong et al. | 430/270 |
| 5,192,626 A | * | 3/1993 | Sekiya et al. | 428/694 |
| 5,279,877 A | * | 1/1994 | Uchiyama et al. | 428/64 |
| 5,430,706 A | * | 7/1995 | Utsunomiya et al. | 369/275.1 |
| 5,577,020 A | * | 11/1996 | Utsunomiya et al. | 369/275.2 |
| 5,578,355 A | * | 11/1996 | Hirata et al. | 428/64.3 |
| 5,640,382 A | * | 6/1997 | Florczak et al. | 369/275.1 |
| 5,641,606 A | * | 6/1997 | Suzuki et al. | 430/270.13 |
| 5,702,793 A | * | 12/1997 | Shimokawa et al. | 428/64.3 |
| 5,840,466 A | * | 11/1998 | Nonaka et al. | 430/270.13 |
| 5,891,542 A | * | 4/1999 | Tominaga et al. | 428/64.1 |
| 6,115,351 A | * | 9/2000 | Utsunomiya et al. | 369/275.2 |
| 6,190,763 B1 | * | 2/2001 | Takahashi | 428/332 |
| 6,192,024 B1 | * | 2/2001 | Inoue et al. | 369/275.3 |
| 6,217,968 B1 | * | 4/2001 | Maro et al. | 428/64.1 |
| 6,246,640 B1 | * | 6/2001 | Shimazaki et al. | 369/13 |
| 6,251,492 B1 | * | 6/2001 | Tomie | 428/64.1 |
| 6,254,966 B1 | * | 7/2001 | Kondo | 428/156 |
| 6,262,949 B1 | * | 7/2001 | Inoue et al. | 369/275.1 X |
| 6,348,251 B1 | * | 2/2002 | Tsai et al. | 428/64.1 |
| 6,403,193 B1 | * | 6/2002 | Shingai et al. | 428/64.1 |

FOREIGN PATENT DOCUMENTS

| | | | | |
|---|---|---|---|---|
| JP | 9-175041 | * | 7/1987 | |
| JP | 1-112539 | * | 5/1989 | |
| JP | 2-285538 | * | 11/1990 | |
| JP | 05-159398 | * | 6/1993 | |
| JP | 7-134838 | | 5/1995 | |
| JP | 10-320859 | * | 12/1998 | |
| JP | 11-120613 | * | 4/1999 | |
| JP | 11-126387 | * | 5/1999 | ........... G11B/11/10 |
| WO | WO96/08008 | * | 3/1996 | |

OTHER PUBLICATIONS

Machine translation of JP 11–120613.*
MAT of JP 11–126387.*
Modern Magnetooptics and Magnetooptical Materials, Zvezdin & Kotov, © 1997, ISBN 075030362X pp. 241,242, 373.*

* cited by examiner

Primary Examiner—Aristotelis M. Psitos
(74) Attorney, Agent, or Firm—Oblon, Spivak, McClelland, Maier & Neustadt, P.C.

(57) ABSTRACT

Reduction in noise of the read out signal as well as enhanced storage reliability are realized in an optical recording medium comprising a supporting substrate, and a reflective layer, a recording layer, and a light-transmitting substrate disposed on the supporting substrate in this order. The optical recording medium comprises a supporting substrate 20, and an intermediate layer 10 comprising an amorphous material, a reflective layer 5 comprising a polycrystalline material, a recording layer 4, and a light-transmitting substrate 2 disposed on the supporting substrate in this order. The write beam and the read beam are directed through the light-transmitting substrate 2.

22 Claims, 1 Drawing Sheet

OPTICAL RECORDING MEDIUM CONTAINING A SUBSTRATE, AN INTERMEDIATE LAYER HAVING THEREIN AN AMORPHOUS MATERIAL, THE INTERMEDIATE LAYER HAVING A REFLECTIVE LAYER THEREON

BACKGROUND OF THE INVENTION

1. Field of the Invention

This invention relates to an optical recording medium such as an optical recording disc.

2. Prior Art

Optical information media such as read-only optical discs and optical recording discs have been required to have a higher capacity by increasing the recording density for the purpose of recording and storing an enormous amount of information as in the case of motion picture information. Extensive efforts have been dedicated to the research and development of the recording at a higher density to meet such request.

Under such situation, one proposal has been use of a reduced diameter of the laser beam spot in the writing and reading as in the case of DVD (Digital Versatile Disk) by reducing the wavelength used in the writing/reading and increasing the numerical aperture (NA) of the objective lens of the writing/reading optical system. When DVD is compared to CD, DVD has realized a recording capacity (of 4.7 GB/side) which is 6 to 8 times larger than that of the CD by reducing the writing/reading wavelength from 780 nm to 650 nm and increasing the NA from 0.45 to 0.6.

Use of a higher NA, however, invites decrease of tilt margin. Tilt margin is tolerance for the tilting of the optical information medium in relation to the optical system, and the tilt margin is determined by the NA. When the writing/reading wavelength is $\lambda$, and the transparent substrate through which the writing/reading enters the medium has a thickness t, the tilt margin is proportional to $$\lambda/(t \cdot NA^3)$$

Tilting of the optical recording medium at an angle to the laser beam, namely, occurrence of the tilt results in the generation of wave front aberration (coma aberration). When the substrate has a refractive index of n and a tilt angle of $\theta$, the wave front aberration coefficient is given by $$(\tfrac{1}{2}) \cdot t \cdot \{n^2 \cdot \sin\theta \cdot \cos\theta\} \cdot NA^3/(n^2 - \sin^2\theta)^{-5/2}$$

These relations indicate that decrease in the thickness t of the substrate is effective when the tilt margin is to be increased and the generation of the coma aberration is simultaneously to be suppressed. As a matter of fact, tilt margin is ensured in the case of DVD by reducing the thickness of the substrate to about half (about 0.6 mm) of the thickness of the CD (about 1.2 mm). In the meanwhile, thickness variation margin of the substrate is given by $$\lambda/NA^4$$

When the substrate has varying thickness, such variation in the thickness further results in wave front aberration (spherical aberration). When the substrate has a thickness variation of $\Delta t$, the spherical aberration coefficient is given by $$\{(n^2-1)/8n^3\} \cdot NA^4 \cdot \Delta t$$

These relations indicate need for reduction of the substrate thickness variation for the purpose of suppressing the spherical aberration associated with the increase in the NA. For example, in the case of DVD, $\Delta t$ is suppressed to $\pm 30$ μm compared to that of $\pm 100$ μm in CD.

A structure enabling further decrease in the substrate thickness has been proposed in order to realize high quality motion picture recording for longer period. In this structure, a substrate having normal thickness is used as a supporting substrate for retaining rigidity of the medium, and the pits and the recording layer are formed on the surface, and a light-transmitting layer in the form of a thin substrate having a thickness of about 0.1 mm is provided on the recording layer. The write/read beam is introduced into the medium through this light-transmitting layer. This structure enables drastic reduction in the thickness of the substrate, and high density recording by the use of a higher NA is thereby enabled. A medium having such structure is described, for example, in Japanese Patent Application Laid-Open No. (JP-A) 320859/1998.

The medium described in JP-A 320859/1998 is a magneto-optical recording medium, and this magneto-optical recording medium has the structure wherein a metal reflective layer, a first dielectric layer, magneto-optical recording layer, a second dielectric layer, and a light-transmitting layer are disposed on the substrate in this order. In JP-A 320859/1998, surface roughness of the metal reflective layer at the interface between the dielectric layer and the metal reflective layer is reduced to the level of less than 8.0 nm based on the view that increase in the noise of the read-out signal is induced by the excessively large surface roughness of the metal reflective layer formed by sputtering. In JP-A 320859/1998, a material containing aluminum, and preferably, a material containing aluminum and in addition, at least one member selected from Fe, Cr, Ti and Si, or gold or silver is used as the material for constituting the metal reflective layer, and ion beam sputtering or magnetron sputtering is employed for the layer formation.

However, from the point of optimizing the recording sensitivity and the reflectivity in practical medium design, it is not preferable that a limitation of the material used for the metal reflective layer is imposed for the purpose of reducing the surface roughness.

It has also been found out in the investigation of the inventors of the present invention that the medium of the constitution described in JP-A 320859/1998 is associated with the risk of defects in the metal reflective layer when the medium is stored under high temperature, high humidity conditions.

SUMMARY OF THE INVENTION

An object of the present invention is to reduce noise of the read-out signal and to realize sufficient storage reliability in an optical recording medium comprising a supporting substrate, and a reflective layer, a recording layer, and a light-transmitting substrate disposed on the supporting substrate in this order.

Such objects are attained by the present invention as described in (1) to (4), below.

(1) An optical recording medium to be written and read with a light beam comprising a supporting substrate, and an intermediate layer comprising an amorphous material, a reflective layer comprising a polycrystalline material, a recording layer, and a light-transmitting substrate disposed on the supporting substrate in this order, wherein said medium is used by introducing the write beam and the read beam through the light-transmitting substrate.

(2) The optical recording medium according to the above (1) wherein said intermediate layer has a thickness in the range of 10 to 500 nm.

(3) The optical recording medium according to the above (1) wherein said supporting substrate has guide grooves formed therein, and record marks are formed in the guide groove and/or in the area between adjacent guide grooves.

(4) The optical recording medium according to the above (1) wherein said light-transmitting substrate has a thickness in the range of 30 to 300 µm.

DETAILED DESCRIPTION OF THE INVENTION

Figure 1:
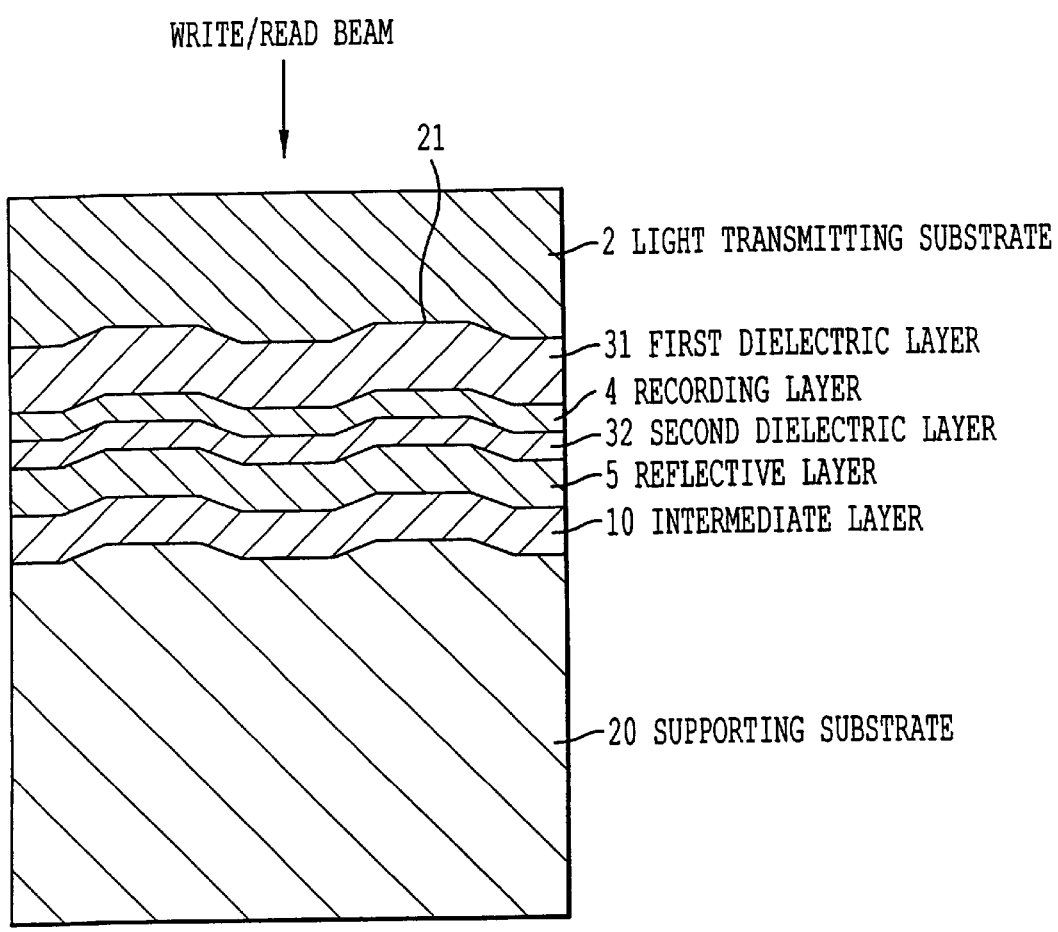
FIG. 1 is a partial cross-sectional view showing an embodiment of the optical recording medium of the present invention.

An embodiment of the optical recording medium according to the present invention is shown in FIG. 1. This optical recording medium is a phase change optical recording medium, and comprises a supporting substrate 20 and an intermediate layer 10, a reflective layer 5, a second dielectric layer 32, a recording layer 4, a first dielectric layer 31, and a light-transmitting substrate 2 in this order. The write beam and the read beam enter the medium through the light-transmitting substrate 2. The present invention is applicable regardless of the type of the recording layer, for example, irrespective of whether the medium is a phase change recording medium, a recording medium wherein pits are formed, or a magneto-optical recording medium.

In the present invention, noise of the read-out signal can be reduced by providing an intermediate layer 10 comprising an amorphous material and a reflective layer 5 on the intermediate layer 10 when the reflective layer 5 is formed from a polycrystalline material. Although the reason for such effects is not yet clear, it is believed that provision of the intermediate layer 10 results in alteration in the crystallinity of the reflective layer 5, and hence, in the change in surface properties such as smoothenings of the upper surface (the surface on the side of the recording layer 4) of the reflective layer 5.

The provision of the intermediate layer 10 comprising an amorphous material also prevents occurrence of defects in the reflective layer 5 during the storage under high temperature, high humidity conditions, and storage reliability is thereby improved. Although such improvement in the storage reliability is realized independently from the composition of the reflective layer, a marked improvement is realized when the reflective layer contains silver as its main component, and in particular, when the silver content is in the range of 60 to 100 at %. The mechanism for the improvement in the storage reliability by such provision of the intermediate layer 10 is yet unclear. However, it is postulated that the reflective layer 5 undergoes a minute deformation during the storage of the medium under high temperature, high humidity conditions, and such deformation invites delamination of the reflective layer 5 from the supporting substrate 20 and results in the defects of the reflective layer 5. In contrast, when the intermediate layer 10 comprising an amorphous material is provided, the intermediate layer 10 functions as a buffer layer, and as a consequence, delamination of the reflective layer 5 from the supporting substrate 20 is suppressed. It should be noted that, in the experiments of the inventors of the present invention, the effect of preventing the defects in the reflective layer was realized even when the intermediate layer 10 comprising crystalline aluminum oxide was provided when the layer deposited had a sufficient thickness. However, the effect of the noise reduction was not realized in such a case.

In the phase change optical recording medium, for example, grooves (guide grooves) and lands are generally provided on the substrate for the purpose of tracking, and the groove may also carry address information. It has been commonplace in the past to form record marks either in the groove or in the area between adjacent grooves (land). However, land/groove recording wherein both the groove and the land are used for the recording track has been recently proposed in order to reduce the recording track pitch and enable high density recording. However, when the recording track pitch is reduced in the medium wherein the land/groove recording is conducted, beam spot of the laser beam used for the recording and reading will extend into the adjacent track, and this invites increased cross talk in the reading.

In view of such situation, JP-A 134838/1995 proposes matching of the recording characteristics between the land and the groove by adjusting the groove and the land to the substantially same width and limiting the groove depth to an adequate value, and in addition, by limiting the relation between the thickness of the second dielectric layer formed on the recording layer and the thickness of the reflective layer formed on the second dielectric layer. It should be noted that the optical information recording medium described in JP-A 134838/1995 has a structure wherein the first dielectric layer, the recording layer, the second dielectric layer, the reflective layer, and the protective cover are laminated in this order on the substrate.

However, from the practical view of optimizing the recording sensitivity and the reflectivity in the medium design, it is not preferable that a limitation is imposed on the thickness of the second dielectric layer for the matching of the recording characteristics between the land and the groove.

In contrast, when the intermediate layer 10 is provided between the supporting substrate 20 and the reflective layer 5, difference in read-out characteristic between the land and the groove could be reduced with no change in the thickness of the dielectric layer or the recording layer disposed between the reflective layer 5 and the light-transmitting substrate 2, and with no change in the width of the land or the groove and the depth of the groove. This effect was unexpectedly realized.

Next, the parts of the medium shown in FIG. 1 are described in detail for their constitution.

Supporting Substrate 20

The supporting substrate 20 is provided for the purpose of maintaining the rigidity of the medium. The thickness of the supporting substrate 20 is generally in the range of 0.2 to 1.2 mm, and preferably, in the range of 0.4 to 1.2 mm, and the supporting substrate 20 may be either transparent or non-transparent. Although the supporting substrate 20 may comprise a resin as in the case of typical optical recording medium, the supporting substrate 20, however, may be formed from glass. The guide grooves generally provided in the optical recording medium may be provided in the present invention by transcribing the shape of grooves formed in the supporting substrate 20 to the layers formed thereon. In the embodiment shown in FIG. 1, the guide groove 21 is a groove in the form of a recess when seen from the direction of the beam incidence.

Intermediate Layer 10

The intermediate layer 10 is formed from an amorphous inorganic material, which is preferably a dielectric material. The dielectric material used is not particularly limited, and the material used may be a compound containing at least one metal component selected from Si, Ge, Zn, Al, and rare earth metals, and the material is preferably an oxide, a nitride, or a sulfide. A mixture containing two or more of the foregoing is also usable. Exemplary preferable materials are a mixture of zinc sulfide and silicon oxide ($ZnS$—$SiO_2$), aluminum nitride, and aluminum oxide, and in particular, $ZnS$—$SiO_2$. The $ZnS$—$SiO_2$, is preferably the one wherein $SiO_2/(ZnS+SiO_2)$ is in the range of 10 to 80% by mole, and in particular 10 to 60% by mole. When the proportion of $SiO_2$ is below such range, reduction in the noise will be insufficient due to crystallization. On the other hand, an excessively high proportion of $SiO_2$ results in insufficient prevention of the defects in the reflective layer. It should be noted that the intermediate layer 10 may also comprise a laminate of two ore more amorphous layers each having different compositions.

The effect of improving the storage reliability by the provision of the intermediate layer 10 is realized when the intermediate layer 10 is amorphous. For realizing sufficient level of storage reliability, the intermediate layer 10 is preferably formed from a $ZnS$—$SiO_2$ wherein the $SiO_2/(ZnS+SiO_2)$ is within the range as described above. For achieving even higher storage reliability, the film stress of the intermediate layer 10 may is preferably adjusted to the range of $-250$ to $250$ $N/mm^2$, and more preferably, to the range of $-200$ to $200$ $N/mm^2$. The film stress of the intermediate layer 10 can be adjusted by controlling the material used, thickness, conditions of the film formation, and the like.

The intermediate layer 10 is preferably deposited to a thickness of 10 to 500 nm, and more preferably to a thickness of 20 to 300 nm, and more preferably to a thickness of 40 to 300 nm. The merits of the present invention is less likely to be achieved when the intermediate layer is too thin while no particular problem arises from an excessively thick intermediate layer. However, the intermediate layer is preferably deposited to a thickness not exceeding the above-specified range in view of the productivity and the cost.

The method for forming the intermediate layer 10 is not particularly limited as long as an amorphous thin film is formed. The intermediate layer 10, however, is preferably formed by sputtering.

Reflective Layer 5

The reflective layer may be formed from any desired material, and typically, from a metal of high reflectivity such as Al, Au, Ag, Pt, Cu, Ni, Cr, or Ti as a simple substance or as an alloy containing at least one of such metals. The reflective layer 5 is typically deposited to a thickness of 10 to 300 nm. The reflectivity is less likely to be sufficient when the thickness is below such range, and deposition to a thickness beyond such range is economically disadvantageous since no substantial improvement in the reflectivity is attained by additional increase in the thickness. It should be noted that the noise of the read-out signal critically increases when the thickness of the reflective layer reaches 50 nm, and in particular, 60 nm, and the present invention is particularly effective for the medium having the reflective layer of such thickness. The reflective layer is preferably formed by vapor deposition such as sputtering and evaporation.

A polycrystalline thin film is formed when the metal as mentioned above is deposited by vapor deposition under conventional conditions. In such case, the crystals in the reflective layer will have a particle size in the range of about 30 to about 100 nm.

First Dielectric Layer 31 and Second Dielectric Layer 32

These dielectric layers prevent oxidation and degradation of the recording layer 4, and also, protect the supporting substrate 20 and the light-transmitting substrate 2 from the heat transmitted from the recording layer 4 during the recording by blocking the heat or by dissipating such heat in lateral direction of the layer. Provision of the dielectric layers also contributes for improving the degree of modulation. The dielectric layer 31 and the dielectric layer 32 may also comprise a laminate of two or more dielectric layers each having different compositions.

Any desired material may be used for the dielectric layers, and the material may be selected from dielectric materials including those mentioned in the description of the intermediate layer 10. The thickness of the dielectric layers may be adequately determined so that sufficient improvement in the protection and degree of modulation are achieved. However, the first dielectric layer 31 is preferably deposited to a thickness of 30 to 300 nm, and more preferably, to a thickness of 50 to 250 nm, and the second dielectric layer 32 is preferably deposited to a thickness of 10 to 50 nm, and more preferably, to a thickness of 13 to 35 nm. The dielectric layers are preferably formed by sputtering.

Recording Layer 4

The composition of the phase change recording material is not particularly limited, and the material is preferably the one containing at least Sb and Te. However, crystallization temperature of the recording layer containing Sb and Te as the only components is as low as about 130° C., and the storage reliability is insufficient. For the increase in the crystallization temperature, the recording layer may preferably comprise elements other than Se and Te. Such element is preferably at least one element selected from In, Ag, Au, Bi, Se, Al, P, Ge, H, Si, C, V, W, Ta, Zn, Ti, Sn, Pb, Pd, and rare earth elements (Sc, Y, and lanthanoids), and among these, the preferred is at least one element selected from rare earth elements, Ag, In, and Ge in view of the particularly high effect in improving the storage reliability.

When the phase change recording material is of the composition as represented by the formula (I):

$$Sb_aTe_bM_c \qquad (I),$$

wherein M represents the element other than Sb and Te, and $a+b+c=1$, atomic ratio of the elements constituting the recording layer is preferably such that $0.2 \leq a \leq 0.85$, $0.1 \leq b \leq 0.6$, and $0 \leq c \leq 0.25$, and more preferably, $0.01 \leq c \leq 0.25$ When the content of Sb is too low in the above formula, crystallization speed will be insufficient and the overwriting will be difficult. On the other hand, when the Sb content is too high, crystallization speed will be excessively high and formation of amorphous record marks will be difficult. When the content of M is too low, the effect of M addition will be insufficient while addition of M in an excessive amount will result in insufficient alteration of the reflectivity with the phase change, and hence, in an insufficient degree of modulation. When Te content is too low, formation of record marks will be difficult due to the difficulty in amorphization. On the other hand, when the Te content is too high, crystallization speed will be insufficient and overwriting will be difficult.

The recording layer is preferably deposited to a thickness of more than 4 nm to 50 nm, and more preferably, to a thickness of 5 nm to 30 nm. When the recording layer is too thin, growth of the crystalline phase, and hence crystallization will be difficult. On the other hand, an excessively thick recording layer will invite difficulty of recording due to increase in heat capacity of the recording layer as well as reduction in the output of the read-out signal.

The recording layer is preferably formed by sputtering.

Light-transmitting Substrate 2

The light-transmitting substrate 2 has a light transmittance sufficient for transmitting the write and read beams. The advantageous effects of the present invention are realized in the medium wherein the recording layer is formed on the reflective layer 5 either directly or with an intervening layer such as the dielectric layer, and therefore, no particular limitation is set for the material or the thickness of the light-transmitting substrate 2. For example, the light-transmitting substrate 2 may comprise a resin plate or a glass plate of the thickness substantially equivalent to that of the supporting substrate 20.

The present invention, however, is particularly effective for use in the high density recording. Accordingly, use of a thinner light-transmitting substrate 2 is preferable as in the case of the light-transmitting layer described in JP-A 320859/1998 as described above for the purpose of enabling the recording at a high recording density by using a writing/reading optical system having a high NA. In such a case, the thickness of the light-transmitting substrate 2 is preferably selected from the range of 30 to 300 $\mu$m. When the light-transmitting substrate is too thin, unduly serious optical effects may be brought by the dust attached to the surface of the light-transmitting substrate. On the other hand, when the light-transmitting substrate is too thick, recording at a higher recording density by the use of a higher NA will be difficult and merits of the present invention will not be sufficiently realized.

The thin light-transmitting substrate 2 may be provided, for example, by adhering a light-transmitting sheet comprising a light-transmitting resin on the first dielectric layer 31 by means of an adhesive, or by directly forming of the light-transmitting resin layer on the first dielectric layer 31 by coating. In either case, the light-transmitting substrate 2 preferably has a highly uniform optical property since the write/read beam enters the medium through the light-transmitting substrate 2. In view of such situation, the thin light-transmitting substrate 2 is preferably of the constitution as described below.

First Constitution of the Light-transmitting Substrate 2

In the provision of the light-transmitting substrate 2 of this constitution, a resin layer comprising a ultraviolet-curable cationic resin (hereinafter also referred to as a UV-curable cationic resin) is cured to thereby form the light-transmitting substrate 2. A UV-curable cationic resin has the features of:

(1) the curing reaction promoted even after the completion of the UV irradiation because of the ionic polymerization (dark reaction);

(2) small shrinkage upon curing; and (3) a relatively slow curing speed.

The feature (1) enables uniform curing of the light-transmitting substrate 2 to the central portion in the thickness direction of the light-transmitting substrate 2, and the resulting light-transmitting substrate 2 exhibits high optical uniformity in the thickness direction with no fear of loss of reliability by the remaining monomer. The feature (2) results in the small distortion of the light-transmitting substrate 2, and adhesion between the light-transmitting substrate 2 and the layer on the side of the supporting substrate will be retained at a sufficient level even when the light-transmitting substrate 2 formed is thick. The feature (3) enables firm bond between the layers even when a thick light-transmitting substrate 2 is formed by repeated coating of the resin, and uniformity in the thickness direction is also attained. Although the UV-curable cationic resins which may be used in the present invention include epoxy resins, vinyl ether resins, and cyclic ether compounds, use of an epoxy resin is preferable. The epoxy resin used may be a bisphenol epoxy resins, a novolak epoxy resin, an alicyclic epoxy resin, or an aliphatic epoxy resin, and use of an alicyclic epoxy resin is preferable. It should be noted that, in the use of the alicyclic epoxy resin, use of a mixture of two or more alicyclic epoxy resins is preferable compared to the use of single alicyclic epoxy resin. The resin layer before its curing contains photopolymerization initiator in addition to the UV-curable cationic resin. The photopolymerization initiator used is not particularly limited, and the photopolymerization initiators may be adequately selected from aromatic diazonium salts, aromatic iodonium salts, aromatic sulfonium salts, metallocene compounds, and the like, among which use of the aromatic sulfonium salts being the preferred. The photopolymerization initiator is preferably incorporated at an amount of 0.1 to 10% by weight of the UV-curable cationic resin.

The resin layer is preferably formed by coating. The coating may be conducted by any desired method selected from spin coating, spray coating, roll coating, screen coating, die coating, curtain coating, dip coating, and the like, among which the spin coating being the preferred. The UV irradiation for the curing of the resin layer may be accomplished by the use of a high pressure mercury lamp which is commonly used in the art.

The light-transmitting substrate is preferably formed by repeating two or more cycles of resin coating and curing. When this method is compared with the method wherein the light-transmitting substrate of equivalent thickness is formed by one coating/curing cycle, the method of forming the resin layer by repeating two or more coating/curing cycles has the merits that the layer is uniformly cured to the central portion in the thickness direction of the photo-cured layer, that the resulting light-transmitting substrate has uniform thickness, and that the light-transmitting substrate exhibits reduced degree of distortion associated with the curing.

In the method wherein the coating/curing cycle is repeated, the thickness of the resin layer formed in one cycle is preferably 1 to 40 $\mu$m, and more preferably, 5 to 20 $\mu$m. When the thickness of the layer formed in one cycle is reduced to the level below such range, the coating solution is likely to be repelled by the underlying layer and the resulting film will suffer from poor quality. When the thickness of the layer formed in one cycle is increased beyond such range, the resulting layer will not fully enjoy the merit of repeating the plurality of cycles.

It should be noted that the method of repeating the cycles of coating and curing may be used for the curable resin other than the UV-curable cationic resin as described above, for example, in the case of a photo-curable resin other than the UV-curable cationic resin or a moisture-curable resin, and also, in the case of the resin other than the curable resin. In such case, the resin is dried instead of the curing, and in other words, the light-transmitting substrate is formed by repeating the cycles of coating and drying steps. The resin which may be used in such a case is a thermoplastic resin used by dissolving in a solvent. The method, however, is effective for use in the case of a UV-curable resin, and in particular, in the case of a UV-curable cationic resin.

Second Constitution of the Light-transmitting Substrate 2

In the provision of the light-transmitting substrate 2 of this constitution, the light-transmitting substrate 2 is constituted from a light-transmitting sheet and an adhesive layer for adhesion of the light-transmitting sheet to the first dielectric layer 31. The adhesive layer comprises a pressure-sensitive adhesive which is transparent to the write/read beam, and which exhibits adhesion sufficient for bonding of the light-transmitting sheet to the layer on the side of the supporting substrate.

The merits of using the adhesive for bonding of the light-transmitting sheet to the layer on the side of the supporting substrate include:

(1) that the sheet is free from distortion caused by shrinkage in the curing since the curing required in the case of the UV-curing adhesive is unnecessary, and this results in the less likeliness of the medium to undergo the distortion;

(2) that the sheet is free from distortion caused by shrinkage in the curing since the curing is unnecessary, and birefringence of the light-transmitting sheet is little increased;

(3) that use of a simpler apparatus is enabled since the step of curing is unnecessary; and (4) that the adhesive layer can be preliminarily formed on the light-transmitting sheet as a coating film, and reduced variation in the film thickness is thereby realized. The material used for the adhesive layer may be any desired material such as an acrylic resin, a silicone resin, a rubber-based material, and use of an acrylic resin is preferable in view of favorable optical properties, wide design margin of the adhesion and heat resistance, and the low cost. The procedure of the adhesive layer formation is not limited, and coating of the adhesive on the light-transmitting sheet to a uniform thickness is preferred as described above. Also preferred is production of an adhesive sheet by coating the adhesive on both sides of a transparent film substrate, and use of the thus produced adhesive sheet as the adhesive layer in the adhesion of the light-transmitting sheet to the layer on the side of the supporting substrate. The method used for the adhesive coating is not particularly limited, and the coating method may be adequately selected from die coating, roll coating, gravure coating, dip coating and the like, among which the die coating being the preferred in view of reducing the variation in the film thickness. The thickness of the adhesive layer may be adequately determined so that the adhesive layer has uniform thickness and sufficient adhesion is attained. The adhesive layer, however, may preferably have a thickness in the range of 5 to 70 $\mu$m, and more preferably, 10 to 50 $\mu$m. When the adhesive layer is too thin, adhesion will be insufficient and yield of the adequately adhered product will be reduced. On the other hand, an excessively thick adhesive layer will invite undesirable increase in the variation of the film thickness, and use of a thinner light-transmitting sheet will be required.

The material used for the light-transmitting sheet is preferably one member selected from a polycarbonate, a polyarylate, and a cycloolefin polymer. The polycarbonate used is not particularly limited, and an aromatic polycarbonate of bisphenol type commonly used in the art can be employed. An exemplary commercially available polycarbonate sheet produced by sheet solvent casting as described below is PURE ACE (manufactured by Teijin Ltd.). The polyarylate is a polyester between a divalent phenol and an aromatic dicarboxylic acid. The polyarylate used in the present invention is an amorphous polyarylate, and use of a condensate between bisphenol A and terephthalic acid is particularly preferred. The polyarylate is likely to exhibit birefringence as in the case of the polycarbonate since it has an aromatic ring. The polyarylate, however, exhibits heat resistance higher than that of the polycarbonate. An example of the commercially available polyarylate sheet produced by the solvent casting as described below is Elmec (manufactured by Kaneka Corp.). It is preferable that the cycloolefin polymer used for the light-transmitting sheet exhibits high light transmittance, and examples of the cycloolefin polymers exhibiting the high light transmittance include amorphous cycloolefin polymers produced by using a norbornene series compound for the starting material. Such cycloolefin polymer also exhibits excellent heat resistance. Commercially available cycloolefin polymers can be used for the light-transmitting sheet. Exemplary such commercially available cycloolefin polymers include ARTON (manufactured by JSR), ZEONEX (manufactured by Nippon Zeon Co., Ltd.), and APEL (manufactured by Mitsui Chemicals, Inc.), among which ARTON and ZEONEX being commercially available as a film product. ARTON and ZEONEX are produced by ring-opening polymerization of a norbornene series monomer followed by hydrogenation. ARTON is readily soluble in a solvent since it has an ester group introduced in the side chain of the norbornene series monomer. Use of ARTON, therefore, is preferable since solvent casting as described below can be used for the sheet formation. ARTON is also preferable since it exhibits good adhesion to an organic material, and use of ARTON enables stronger bonding with the adhesive layer. ARTON is also preferable since it exhibits less likeliness to become charged, and hence, less likeliness of dust attachment.

The method used for the production of the light-transmitting sheet is not particularly limited. However, production of a light-transmitting sheet having a thickness of 300 $\mu$m or less is difficult by the conventional injection molding, and use of a method capable of forming such sheet from the resin is preferable. Exemplary such methods are solvent casting and melt extrusion, among which the solvent casting being the most preferred. The solvent casting is described, for example, in JP-B (Japanese Patent Publication No.) 3-75944. JP-B 3-75944 describes a solvent casting method capable of producing a flexible disc substrate exhibiting excellent transparency, birefringence, flexibility, surface precision, and film thickness uniformity. By adopting such solvent casting, the light-transmitting sheet is produced by the following steps of:

(1) dissolving pellets of the resin such as polycarbonate in a solvent such as methylene chloride, acrylonitrile, or methyl acrylate;

(2) thoroughly agitating, defoaming, and filtering the solution, and continuously casting the solution onto a mold having a high surface precision from a die; and (3) passing the cast sheet through a drying oven to evaporate the solvent and taking up the resulting sheet on a roll.

The light-transmitting sheet produced by such method exhibits lower birefringence compared to the sheet produced by ordinary melt extrusion since smaller tension is applied to the sheet. In contrast, the sheet produced by melt extrusion has birefringence distribution along its axis of drawing. In addition, a sheet having uniform thickness and excellent surface properties can be produced by adequately adjusting the solvent evaporation speed, and the sheet produced is free from defects caused by the die line which is often found in the sheet produced by melt extrusion. It should be noted that evaluation of the light-transmitting sheet for its production method whether the sheet has been produced by solvent casting or not can be accomplished by confirming isotropy of the birefringence pattern, or through qualitative analysis of the solvent remaining in the sheet, for example, by gas chromatography.

EXAMPLES

Examples of the present invention are given below by way of illustration and not by way of limitation.

Example 1

Samples of the optical recording disc as shown in FIG. 1 were produced by the procedure as described below.

A supporting substrate 20 in the form of a disc having a diameter of 120 mm and a thickness of 0.6 mm was prepared by injection molding polycarbonate. Grooves were simultaneously formed in the injection molding of the supporting substrate 20 to a depth of 50 nm and width of 0.4 μm at a pitch of 0.8 μm.

On the supporting substrate 20 was formed an intermediate layer 10 by sputtering in argon atmosphere using ZnS (80 mol %)—SiO$_2$ (20 mol %) for the target. The thickness of the intermediate layer is shown in Table 1. A sample having no intermediate layer was also produced for comparison purpose.

On the intermediate layer 10 was formed a reflective layer 5 by sputtering in argon atmosphere using Al −1.7 at % Cr for the target. The reflective layer was formed to a thickness of 100 nm. When a sample for evaluation purpose prepared by disposing only the intermediate layer 10 on a glass substrate was analyzed by X-ray diffraction, the intermediate layer 10 was confirmed to be amorphous. When a sample for evaluation purpose prepared by disposing the intermediate layer 10 and the reflective layer 5 on a glass substrate was analyzed by X-ray diffraction and observation under scanning electron microscope, the reflective layer 5 was confirmed to be polycrystalline.

The second dielectric layer 32 was formed by sputtering in argon atmosphere using ZnS (50 mol %)—SiO$_2$ (50 mol %) for the target. The second dielectric layer was formed to a thickness of 26 nm.

The recording layer 4 was formed by sputtering in argon atmosphere using Ag-In-Sb-Te-Ge alloy for the target. The recording layer had a composition (atomic ratio) of $$(Ag_{0.056} In_{0.038} Sb_{0.632} Te_{0.252}) Ge_{0.022}.$$

The recording layer was formed to a thickness of 14 nm.

On the recording layer 4 was formed a first dielectric layer 31 having a bilayer structure. The layer in contact with the recording layer 4 was formed to a thickness of 5 nm by sputtering in argon atmosphere using ZnS (50 mol %)—SiO$_2$ (50 mol %) for the target. The layer in contact with the light-transmitting substrate 2 was formed to a thickness of 230 nm by sputtering in argon atmosphere using ZnS (80 mol%)—SiO$_2$ (20 mol %) for the target.

The light-transmitting substrate 2 was disposed on the surface of the first dielectric layer 31 by adhering a polycarbonate plate having of 0.6 mm thick to the first dielectric layer 31 with an intervening adhesive layer of 30 μm thick. The adhesive sheet used was a double-side adhesive sheet formed by coating an acrylic resin-based adhesive on both sides of a transparent substrate.

The recording layer of the samples was initialized (crystallized) on a bulk eraser, and the samples were recorded on an optical recording medium evaluator under the conditions:

laser beam wavelength: 634 nm, numerical aperture, NA: 0.6, linear velocity: 3.5 m/s, and recording signal: 8–16 modulated signal.

The recording was conducted for both the land and the groove. Next, the recorded signal was read to and output of the read-out signal, C/N of the 3T signal, noise, and jitter were measured. The results are shown in Table 1.

TABLE 1

| Sample No. | Thickness of intermediate layer (nm) | Output (V) Groove | Output (V) Land | 3T-C/N (dB) Groove | 3T-C/N (dB) Land | Noise (dBm) Groove | Noise (dBm) Land | Jitter (%) Groove | Jitter (%) Land |
|---|---|---|---|---|---|---|---|---|---|
| 101 | 250 | 0.56 | 0.55 | 46.6 | 46.9 | −67.5 | −66.9 | 10.5 | 10.2 |
| 102 | 180 | 0.50 | 0.55 | 46.1 | 46.6 | −67.3 | −66.6 | 11.5 | 11.2 |
| 103 | 100 | 0.43 | 0.55 | 45.2 | 46.0 | −67.2 | −66.4 | 12.2 | 12.0 |
| 104 | 50 | 0.40 | 0.54 | 43.8 | 46.4 | −67.0 | −66.2 | 12.8 | 12.5 |
| 105 Comp. | — | 0.38 | 0.54 | 42.9 | 45.0 | −66.8 | −65.9 | 15.1 | 14.9 |

Comparison between the samples provided with the intermediate layer 10 and the Sample No. 105 provided with no intermediate layer 10 reveal the improved output and C/N as well as reduced noise and jitter of the present invention. The comparison also reveals that difference in the read characteristics between the groove and the land is reduced in the samples of the present invention compared to the comparative sample.

It should be noted that the intermediate layer 10 of Sample Nos. 101 to 104 had a film stress in radial direction and in tangential direction in the range of −200 to 200 N/mm$^2$.

The film stress of the intermediate layer was measured by the procedure as described below. Two polyimide films each having a length of 22 mm and a width of 10 mm were prepared, and one film was disposed on the supporting substrate 20 so that its long axis was parallel to the radial direction of the supporting substrate 20 while the other film was disposed such that its long axis was parallel to the tangential direction of the supporting substrate 20. The intermediate layer was then disposed on the surface of these films under the conditions equal to those of the sample discs. Next, distortion along the long axis of each film was measured, and the film stress a in radial and tangential directions was calculated by the equation:

$$\sigma = Eb^2\delta/\{3(1-v)dL^2\}$$

wherein E: Young's modulus of the film,
b: thickness of the film,
v: Poisson's ratio of the film,
L: length of the film,
d: thickness of the intermediate layer, and
δ: distortion of the film.

Example 2

Samples of optical recording discs were produced by repeating the procedure of Example 1 except that the intermediate layer 10 had the composition and the thickness as shown in Table 2, and the light-transmitting substrate 2 was constituted from a UV-curable resin layer having a thickness of 100 μm. The intermediate layers in these samples were amorphous, and their film stress are shown in Table 2. It should be noted that the compositions shown in Table 2 as $ZnS:SiO_2(80:20)$ and $ZnS:SiO_2(50:50)$ respectively represent the compositions of ZnS(80 mol %)—$SiO_2$(20 mol %) and ZnS(50 mol%)—$SiO_2$(50 mol %), and LaSiON shown in Table 2 was an oxide complex having the composition represented by the molar ratio of $(La_2O_3)_{20}(Si_3N_4)_{50}(SiO_2)_{30}$. In addition, "1.4 Pa" or "0.2 Pa" indicated under the LaSiON is the pressure used in the formation of the intermediate layer comprising the LaSiON by sputtering. In Sample Nos. 203 and 204, film stress was altered by using different sputtering pressure.

These samples were stored under high temperature, high humidity conditions of 80° C. and 80% RH for 50 hours, and evaluated for occurrence of defects in the reflective layer 5. The results are shown in Table 2. It should be noted that the results for Sample No. 105 are also indicated in Table 2 for comparison purpose.

TABLE 2

| Sample No. | Composition | Thickness (nm) | Film stress (N/mm²) Radial | Film stress (N/mm²) Tangential | Defects in reflective layer |
|---|---|---|---|---|---|
| 201 | ZnS:SiO₂ (20:80) | 50 | 114.7 | 103.0 | 0 |
| 202 | ZnS:SiO₂ (50:50) | 50 | 125.5 | 137.3 | 0 |
| 203 | LaSiON (1.4 Pa) | 50 | −137.3 | −137.3 | 4 |
| 204 | LaSiON (0.2 Pa) | 50 | −252.0 | −262.8 | 10 |
| 205 | SiO₂ | 50 | 137.3 | 103.0 | 1 |
| 105 comp. | — | — | — | — | 13 |

As evident from the results shown in Table 2, provision of the intermediate layer results in the improvement of the storage reliability. The defect occurred in the reflective layer was loss of the layer in the spot of about 0.1 to 1 mm in diameter.

MERITS OF THE INVENTION

In the present invention, reduction in noise of the read out signal caused by the reflective layer comprising the polycrystalline material as well as reduction in the difference of the read characteristics between the land and the groove are attained in the optical recording medium comprising the supporting substrate, and the reflective layer, the recording layer, and the light-transmitting substrate disposed on the supporting substrate in this order.

Japanese Patent Application Nos. 329869/1999 and 302796/2000 are incorporated herein by reference.

Although some preferred embodiments have been described, many modifications and variations may be made thereto in the light of the above teachings. It is therefore to be understood that, within the scope of the appended claims, the invention may be practiced otherwise than as specifically described.

What is claimed:

1. An optical recording medium, comprising;

a) a supporting substrate, and thereon in order;

b) an intermediate layer comprising an amorphous material;

c) a reflective layer having a thickness of 50 to 300 nm comprising a polycrystalline material which comprises 60 to 100 at % of Ag;

d) a recording layer; and e) a light-transmitting substrate.

2. The optical recording medium of claim 1, wherein the intermediate layer b) has a thickness in the range of from 10 to 500 nm.

3. The optical recording medium of claim 1, wherein the supporting substrate a) has guide grooves formed therein, and record marks are formed in the guide grooves or in the area between adjacent guide grooves or both.

4. The optical recording medium of claim 1, wherein the light-transmitting substrate e) has a thickness in the range of 30 to 300 μm.

5. The optical recording medium of claim 1, wherein the supporting substrate has a thickness in the range of 0.2 to 1.2 μm.

6. The optical recording medium of claim 1, wherein the supporting substrate is transparent.

7. The optical recording medium of claim 1, wherein the supporting substrate is non-transparent.

8. The optical recording medium of claim 1, wherein the amorphous material comprises a dielectric material.

9. The optical recording medium of claim 1, wherein the amorphous material is an oxide, sulfide or nitride of Si, Ge, Zn, Al or a rare earth metal.

10. The optical recording medium of claim 9, wherein the amorphous material is ZnS—$SiO_2$.

11. The optical recording medium of claim 1, wherein the intermediate layer b) is adjusted to exhibit a film stress of −250 to 250 N/mm².

12. The optical recording medium of claim 1, wherein the intermediate layer b) has a thickness of 20 to 300 nm.

13. The optical recording medium of claim 1, wherein the reflective layer c) further comprises Al, Au, Pt, Cu, Ni, Cr or Ti.

14. The optical recording medium of claim 1, which further comprises a first dielectric layer between said reflective layer c) and said recording layer d).

15. The optical recording medium of claim 14, which further comprises a second dielectric layer between said recording layer d) and said light-transmitting substrate e).

16. The optical recording medium of claim 15, wherein said second dielectric layer has a thickness of 30 to 300 nm.

17. The optical recording medium of claim 14, wherein said first dielectric layer has a thickness of 30 to 300 nm.

18. The optical recording medium of claim 1, wherein the recording layer is a phase change recording material comprising at least Sb and Te.

19. The optical recording medium of claim 18, wherein the recording layer d) further comprises at least one element which is a rare earth element, Ag, In or Ge.

20. The optical recording medium of claim 19, wherein the recording material comprises $$Sb_aTe_bM_c$$

wherein:

M represents at least one element selected from the group consisting of a rare earth element, Ag, In and Ge; and (a+b+c) is 1;

wherein:

0.2<a<0.85

0.1<b<0.6, and

0<c<0.25.

21. The optical recording medium of claim 20, wherein:

$$0.01 \leq c \leq 0.25.$$

22. The optical recording medium of claim 1, wherein the light-transmitting substrate comprises a cured UV-curable cationic resin.

* * * * *